US006789938B2

(12) United States Patent
Sandu et al.

(10) Patent No.: US 6,789,938 B2
(45) Date of Patent: Sep. 14, 2004

(54) DEVICE AND METHOD FOR REMOVING BUILD-UP ON MEASUREMENT GAUGES

(75) Inventors: Constantine Sandu, Tustin, CA (US); Liviu V. Popa, Garden Grove, CA (US); John J. Mercurio, Rossford, OH (US)

(73) Assignee: ConAgra Grocery Products Company, Irvine, CA (US)

(*) Notice: Subject to any disclaimer, the term of this patent is extended or adjusted under 35 U.S.C. 154(b) by 75 days.

(21) Appl. No.: 10/231,609

(22) Filed: Aug. 29, 2002

(65) Prior Publication Data

US 2003/0062063 A1 Apr. 3, 2003

Related U.S. Application Data

(60) Provisional application No. 60/315,813, filed on Aug. 29, 2001.

(51) Int. Cl.$^{7}$ .......................... B08B 9/04; B08B 9/023; B08B 9/027; G01K 1/00; G01K 13/00

(52) U.S. Cl. ...................... 374/141; 374/148; 374/208; 15/104.05

(58) Field of Search ........................... 379/141; 15/246, 15/256.5, 249.2, 104.03, 104.5; 134/6, 8, 1, 166, 167; 374/141, 147, 148, 208

(56) References Cited

U.S. PATENT DOCUMENTS

| | | | | | |
|---|---|---|---|---|---|
| 261,234 | A | | 7/1882 | Jameson | |
| 1,597,017 | A | * | 8/1926 | Coleman | 15/249.2 |
| 2,206,006 | A | | 6/1940 | Hendrey | |
| 2,490,531 | A | * | 12/1949 | Martin | 310/93 |
| 2,765,660 | A | | 10/1956 | De Hart | |
| 2,812,921 | A | | 11/1957 | Leith, Jr. | |
| 3,834,232 | A | | 9/1974 | Gruner et al. | |
| 3,839,085 | A | | 10/1974 | Hulvey et al. | |
| 3,912,007 | A | * | 10/1975 | Hellums et al. | 166/175 |
| 3,983,938 | A | * | 10/1976 | Hellums et al. | 166/175 |
| 4,037,471 | A | | 7/1977 | Okamoto et al. | |
| 4,092,858 | A | | 6/1978 | Edgerton | |
| 4,103,552 | A | | 8/1978 | Bucchianeri et al. | |
| 4,114,038 | A | | 9/1978 | Parker | |
| 4,135,642 | A | | 1/1979 | Forward et al. | |
| 4,182,444 | A | | 1/1980 | Fisher | |
| 4,437,968 | A | | 3/1984 | Elliott, Jr. | |
| 4,543,191 | A | | 9/1985 | Stewart et al. | |
| 4,575,261 | A | * | 3/1986 | Berger et al. | 374/136 |
| 4,600,444 | A | * | 7/1986 | Miner | 134/8 |
| 4,663,794 | A | * | 5/1987 | Evans | 15/104.04 |
| 4,827,770 | A | | 5/1989 | Schwartz et al. | |
| 4,912,799 | A | * | 4/1990 | Coleman, Jr. | 15/104.04 |

(List continued on next page.)

FOREIGN PATENT DOCUMENTS

| | | | | | |
|---|---|---|---|---|---|
| JP | 53-25062 | | | 8/1978 | |
| JP | 401255984 | A | | 10/1989 | |
| JP | 05154454 | A | * | 6/1993 | B08B/9/02 |
| JP | 410277505 | A | | 10/1998 | |

OTHER PUBLICATIONS

International Search Report of International Application No. PCT/US02/27827; filed Aug. 29, 2002.

*Primary Examiner*—Gail Verbitsky
(74) *Attorney, Agent, or Firm*—Bingham McCutchen LLP

(57) ABSTRACT

The present invention is directed to a device and method for removing build-up on such measurement gauges. The inventive device and method involve a movable scraper that fits around a cylindrical shield of a measurement gauge and continuously removes the build-up on the shield. Movement of the scraper is accomplished by a magnetic coupling between a magnetic core attached to the scraper, which is inside a pipe or other piece of equipment, and solenoids that are installed on the outside of the pipe. The device and method of the invention ensure instantaneously correct readings from the measurement gauge and improve control and operation strategies of heat exchanges, with significant economic advantages.

31 Claims, 7 Drawing Sheets

U.S. PATENT DOCUMENTS

| | | | | | |
|---|---|---|---|---|---|
| 4,955,924 | A | * | 9/1990 | Gorman | 15/103 |
| 5,300,151 | A | | 4/1994 | Lowther | |
| 5,308,162 | A | * | 5/1994 | Amano et al. | 374/131 |
| 5,460,041 | A | * | 10/1995 | Andes et al. | 73/335.08 |
| 5,600,862 | A | * | 2/1997 | Bleske et al. | 15/104.04 |
| 5,755,970 | A | | 5/1998 | Fourqurean et al. | |
| 5,884,711 | A | | 3/1999 | Shoup | |
| 6,081,729 | A | * | 6/2000 | Bauerschmidt et al. | 455/523 |
| 6,206,978 | B1 | | 3/2001 | Tsui | |
| 6,237,398 | B1 | * | 5/2001 | Porat et al. | 73/54.09 |
| 6,416,261 | B2 | | 7/2002 | Martin | |
| 6,484,490 | B1 | * | 11/2002 | Olsen et al. | 60/39.281 |
| 6,513,385 | B1 | * | 2/2003 | Han et al. | 73/629 |
| 6,553,602 | B1 | * | 4/2003 | Skarupa et al. | 15/104.061 |
| 6,615,710 | B1 | * | 9/2003 | Ishigaki et al. | 100/111 |
| 6,644,848 | B1 | * | 11/2003 | Clayton et al. | 374/7 |
| 2004/0025906 | A1 | * | 2/2004 | Bourrelly et al. | 134/8 |
| 2004/0069322 | A1 | * | 4/2004 | Schneider | 134/8 |
| 2004/0074632 | A1 | * | 4/2004 | Shiraishi et al. | 165/76 |

* cited by examiner

DEVICE AND METHOD FOR REMOVING BUILD-UP ON MEASUREMENT GAUGES

CROSS-REFERENCE TO RELATED APPLICATION

This application claims priority of U.S. Provisional Patent Application No. 60/315,813, filed Aug. 29, 2001, the entire disclosure of which is incorporated herein by reference.

FIELD OF THE INVENTION

The present invention is generally directed to devices used in industrial aseptic processing and, more specifically, to a device and method for removing fouling deposit build-up on measurement gauges used in aseptic processing of food products.

BACKGROUND OF THE INVENTION

The thermal processing system of an aseptic processing and packaging system is made of a series of heaters and coolers connected by a piping network that forms a continuous flow channel for passing processed food products. Measurement devices, such as temperature gauges, are installed at the inlet and outlet of one or more heat exchangers to control the operating properties of the heat exchangers.

Because of the continuous heating and cooling operations during the industrial aseptic processing, insulation build-up, such as fouling deposit, is common on every surface coming in contact with highly fouling-prone fluids, particularly, puddings and gels. This has negative consequences on control and operation of industrial heat exchangers, on the quality of the final product, and on the economics of the industrial process.

While strategies to minimize the fouling effects on heat exchangers are available, their reliability is, among other factors, undermined by the accuracy with which the instantaneous fluid properties, such as temperature, are measured at various points throughout the heating and cooling operations. The main reason for these inaccuracies is the fouling that inevitably accumulates on the temperature and other measurement gauges commonly utilized in the aseptic processing system. These gauges are typically enclosed within a piping structure or other equipment, making them difficult to keep clean. Depending on the extent of the build-up, the instantaneous signal received from the measurement gauge can be in error, in spite of the high resolution of the measurement probe.

Accordingly, there is a need for device and method of removing fouling buildup along the exterior surface of measurement devices used in aseptic processing. Such a device must be easy to manufacture and incorporate into existing thermal processing systems.

SUMMARY OF THE INVENTION

The present invention is directed to a device and method for removing build-up on such measurement gauges. The inventive device and method involve a movable scraper that fits around a protective shield of a measurement gauge and removes the build-up on the shield. Movement of the scraper is preferably accomplished by a magnetic coupling between a magnetic core attached to the scraper, which is inside a pipe or other piece of equipment, and solenoids or permanent magnets that are installed on the outside of the pipe.

In one embodiment, the invention is directed to an apparatus for obtaining local fluid properties along a fluid piping system comprising a primary pipe comprising an inlet, an outlet, and at least one sidewall that defines a conduit for passing fluid from the inlet to the outlet. A protective shield is disposed with the conduit. A scraper is disposed about at least a portion of the protective shield for removing fouling deposit or other buildup on the protective shield. The scraper is longitudinally movable along the protective shield between a first position and a second position by an external force. The external force is preferably an electromagnetic force generated, for example, by solenoids positioned outside the primary pipe. A measurement device, such as a temperature sensor, is mounted within the protective shield between the first position and the second position.

In another embodiment, the invention is directed to a method for cleaning a portion of a protective shield containing a measuring device. The method comprises providing a scraper disposed about at least a portion of the protective shield, and applying an external force to the scraper to move the scraper longitudinally along the protective shield between first and second positions to thereby clean the portion of the protective shield over which the scraper moves.

In yet another embodiment, the invention is directed to an apparatus for obtaining local fluid properties along a fluid piping system. The apparatus comprises a primary pipe comprising an inlet, an outlet, and at least one sidewall that defines a conduit for passing fluid from the inlet to the outlet. A generally-tubular protective shield is disposed with the conduit and has an end that is mounted in a hole in the sidewall of the primary pipe. A measurement device is mounted within the protective shield. A wire extends through the protective shield and has a first end connected to the measurement device and a second end outside the primary pipe.

The present invention provides a device and an improved method for obtaining a more accurate instantaneous reading of the measurement gauge and improve control and operation strategies of heat exchanges, with significant economic advantages.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

Figure 1:
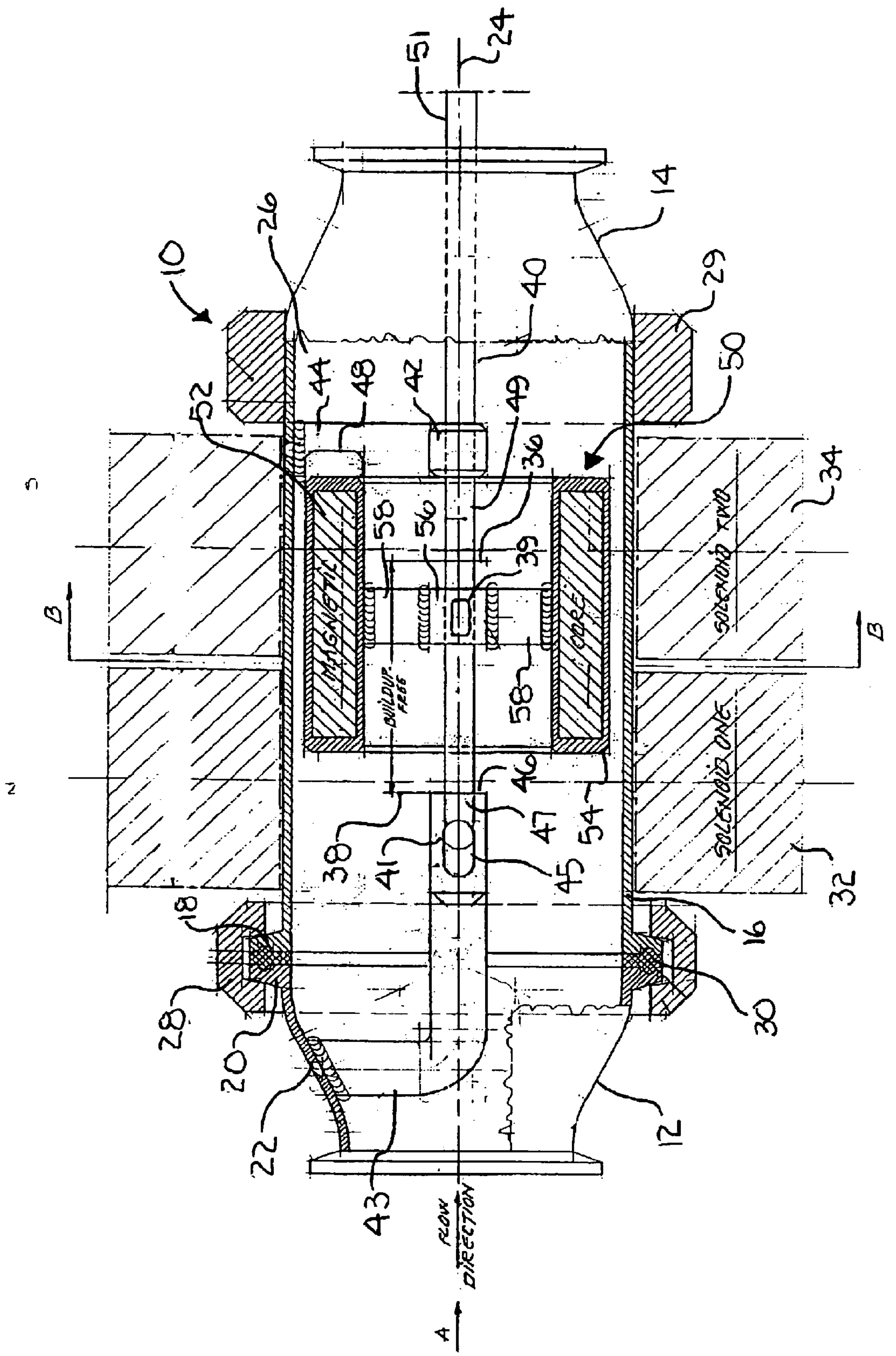
FIG. 1 is a side cross-sectional view of a piping structure comprising a scraper in accordance with the present invention.

The present invention is directed to a device and method for removing fouling deposit build-up on measurement gauges commonly utilized in aseptic processing. The inventive device involves a movable scraper slidably mounted about the outer protective shield of a measurement gauge disposed within a piping structure. The piping structure passes fluid, or food products, along the piping network. The scraper repeatedly translates back-and-forth longitudinally along the measuring device to remove fouling accumulated on the shield. Movement of the scraper is preferably accomplished by a magnetic coupling between a magnetic core incorporated into the scraper, and a pair of solenoids installed about the outer surface of the pipe. The device and method of the invention increases the accuracy of readings from the measurement gauge and improve control and operation strategies of heat exchanges, with significant economic advantages Referring to FIG. 1, in a first embodiment, the movable scraper of the present invention is used within a piping structure having a straight-pipe design. In accordance with this embodiment, the piping structure 10 comprises an inlet 12 at one axial end of the piping, an outlet 14 at an opposite axial end, and a generally annular straight-pipe section 16 coupled between the inlet and the outlet. The piping may be formed from stainless steel, glass, ceramic or other corrosion resistant material. Both the inlet and outlet are preferably contoured in cross-section to condition the flow of fluid passing through the piping.

The straight-pipe section 16 includes an annular flange 18 formed at one of its axial ends for engaging a corresponding flange 20 carried by the inlet. An annular sanitary clamp 28 is fastened about the corresponding flanges 18 and 20 to permanently couple the pipe section to the inlet, and a gasket 30 is disposed between the corresponding flanges to sealing the coupling. The inlet, outlet and straight-pipe sections are coupled together to form a unitary sidewall 22 symmetrically disposed about the piping's central axis 24. The sidewall defines a passage 26 for passing fluid from the inlet to the outlet. A support clamp 29 is installed about the exterior of the piping structure at the outlet. As will become apparent, the precise design and arrangement of the piping is not critical to the invention, and other suitable piping configurations are encompassed within the present invention.

In the depicted embodiment, a pair of solenoids 32 and 34 are disposed about the outer surface of the pipe sidewall 22, between the sanitary and support clamps 28 and 29. The solenoids are magnetically coupled to the movable scraper. The solenoids preferably comprise coiled strands of copper, but may be made of any suitable electrically conductive material. The solenoids are polarized so that they generate an oscillating magnetic field for translating the movable scraper between a first position 36, proximate the outlet end of the straight-pipe section 16, and a second position 38, proximate the inlet end of the straight-pipe section. For the purposes of this invention, the distance between the first position and the second position define the maximum displacement (the "stroke") of the movable scraper, as will be discussed in further detail below. If desired, the solenoids can be replaced with other means for generating an electromagnetic force, such as moveable permanent magnets.

A temperature gauge 39 is centrally disposed within the passage 26, preferably along the central axis 24. The temperature gauge is mounted with a protective shield 40 comprising a proximal end 49 having a tip region 47, and a distal end 51 that extends outside the pipe. The temperature gauge preferably comprises an elongated 0.25 inch diameter resistance temperature detector (RTD) encased within a stainless steel protective cylindrical shield. Such an RTD is manufactured by Bums Engineering Inc., Minnetonka, Minn. However, the temperature gauge may be of any suitable construction, and the protective shield made from any suitable non-corrosive material. The wires (not shown) for the RTD or other temperature gauge extend through the distal end of the protective shield and are connected to a computer or a programmable processing unit (not shown) that stores the local fluid properties read by the RTD.

The RTD shield 40 is fixed in place by first and second support members 41 and 42. The first and second support members 41 and 42 are fixed, preferably by welding, to the piping sidewall 22 by a first holder 43 and a second holder 44, respectively.

The first holder 43 is a substantially L-shaped bar fixed at one end to the sidewall 22 at the inlet. The first holder extends from its fixed end into to the passage 26 to hold the first support member 41 about the central axis 24 at its suspended end. The first support member is a generally cylindrical member integrally formed with the suspended end of the first holder. The first support includes a tapped hole 45 partially extending into its body. The tapped hole is suitably dimensioned to receive the tip region 47 of the RTD shield 40. The first support further includes a front face 46 suitably dimensioned diametrically to provide a bearing surface or stop for limiting the longitudinal translation of the scraper in a first direction to towards the inlet, as will be described in further detail below.

The second holder 44 is an elongated bar fixed to the sidewall at a portion of the straight-pipe section 16 proximate the outlet 14. The second holder extends from its fixed end into to the passage 26 to hold the second support member 42 about the central axis 24 at its free end. The second support is a generally cylindrical member integrally formed with the free end of the second holder and includes an orifice (shown in dashed lines) suitably dimensioned and toleranced to receive a portion the proximal end of the RTD shield extending therethrough. The second holder includes a notch 48 etched near its fixed end. The notch has dimensions suitable for receiving an outer diametrical portion of the scraper. The notch functions as a stop to limit the longitudinal translation of the scraper in a second direction towards the outlet, as will be described in further detail below.

The location of the front face 46 of the first support member 41 and the notch 48 of the second holder 44 define the extreme positions of the stroke of the movable scraper. These locations ensure that the magnetic core can always be attracted or repelled by either one of the solenoids 32 and 34.

Figure 2:
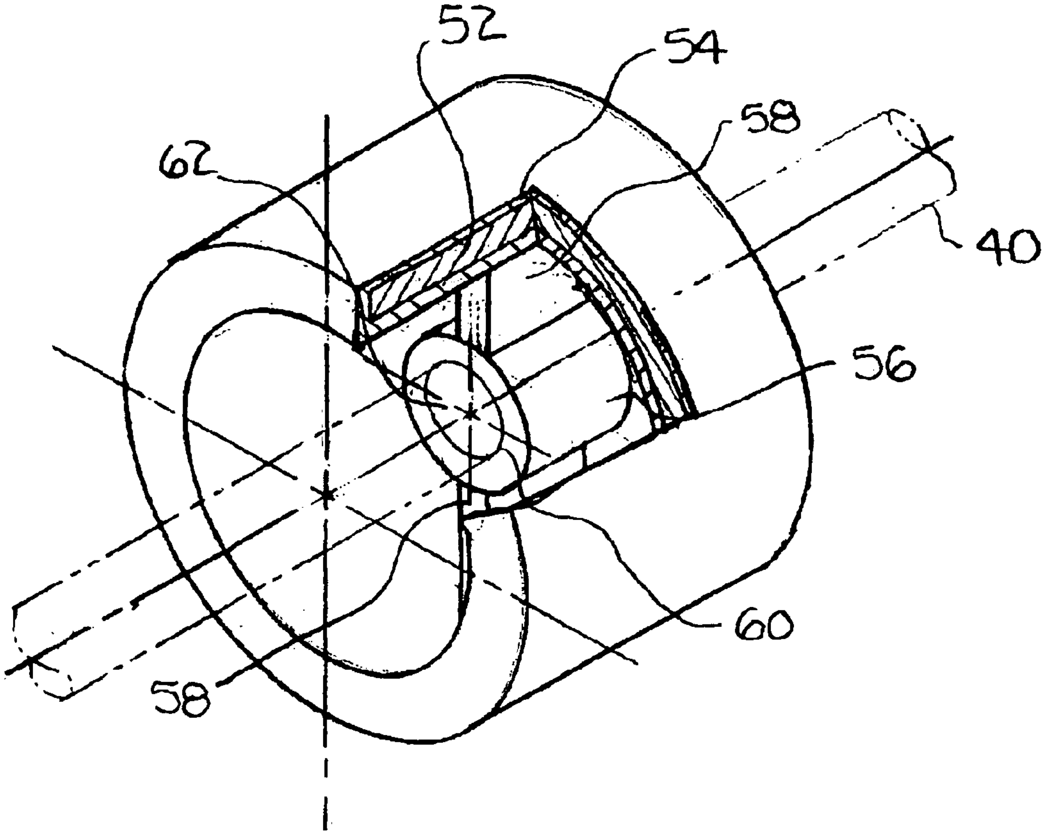
FIG. 2 is a perspective view of the scraper used in conjunction with the piping structure of FIG. 1.

As shown in FIGS. 1 and 2, the scraper 50 is disposed about the RTD shield 40 and movable longitudinally between the first and second support members 41 and 42. Referring now to FIG. 2, the scraper comprises a generally cylindrical magnetic core 52 and a cylindrical scraping element 56 slidably disposed about the RTD shield 40. The magnetic core forms the outermost diametrical portion of the scraper, while the scraping element form the innermost portion. While the scraper is described herein as being disposed about the entire outer circumference of the RTD shield, one skilled in the art would appreciate that the scraper may be disposed about a portion of the RTD shield, for example, about a 90° or 180° portion the RTD shield's outer surface.

The magnetic core 52 of the scraper 50 is formed from a magnetizable material, such as ferrite or rare earth materials (e.g., samarium-cobalt, neodymium-iron-boron, aluminum-nickel-or cobalt-iron), and encased within a stainless steel or other suitable sheathing 54. The outer diameter of the stainless steel sheathing must be machined to a tolerance suitable for the cylindrical magnetic core to reach as close as possible to the sidewall 22 of the pipe. This generates the strongest magnetic coupling between the scraper and the solenoids 32 and 34 while, at the same time, maintaining a certain gap between the magnetic core and the sidewall to prevent any direct friction with the pipe, as well as to allow free flow of any particulate material around the magnetic core.

The cylindrical scraping element 56 is coaxially disposed within the magnetic core and coupled to the sheathing by a pair of elongated truss 58. The scraping element is preferably formed from stainless steel or a thermoplastic material, such as PEEK. The scraping element includes an inner diameter 60 that defines an orifice 62 longitudinally extending therethrough. The inner diameter is suitably dimensioned and toleranced to provide a proper fit around the protective shield of the RTD 40 to allow the scraping element to traverse along the proximal end 49 of the RTD shield with minimal friction. To enhance the scrapping effect of the scraping element, a low friction coefficient between the movable scraper and the protective shield of the RTD may be achieved by coating both the inner surface of the scraping element and the outer surface of the protective shield of the RTD with an appropriate material, such as Nedox7, manufactured by General Magnaplate Corporation, Linden, N.J. A careful concentric design of the piping sidewall 22, magnetic core 52 and scraping element 56 is desirable to provide the proper balancing of the magnetic core within the magnetic field generated by the two solenoids 32 and 34, so that friction between the movable scraper and the protective shield of the RTD is minimized.

In accordance with the present invention, the scraping element traverses back and forth along a portion of the RTD shield to remove or "scrape off" any fouling buildup that may accumulate along the proximal end of the RTD shield. More specifically, the solenoids 32 and 34 are polarized, for example, one with an S-N polarity and one with an N-S polarity, to create an electromagnetic field (EMF) that is applied to the magnetic core 52 to move the scraping element 56 longitudinally along the protective shield of the RTD 40 between the first position 36 and the second position 38. The solenoids generate an EMF sufficient to move the scraper against the hydraulic forces of the fluid flowing through the piping. As mentioned above, the distance that the scraping elements traverses along the RTD shield, referred to herein as the "stroke," defines a section of the RTD shield that is kept free of fouling deposit buildup. The stroke preferably has a length ranging from about 1 to 2 inches. The actual temperature detector placed inside the protective shield of the RTD is preferably located within the limits of the stroke to benefit from the effects of the present invention. The scraper moves at time intervals established depending upon the desired process control. The length of each time interval is a function of the severity of the tendency for build-up on the RTD shield and can range from several seconds to one or more minutes.

It is desirable to use at least two solenoids with the present invention so that one solenoid may be polarized to force the movable scraper 50, for example, towards solenoid 32, while the other solenoid is polarized to move the scraper away from, for example, solenoid 34. Likewise, the polarity of the solenoids may be reversed to move the scraper back towards solenoid 34 to the first (original or resting) position 36.

For purposes of clarity in describing the present invention, the "on" state of the two solenoids will refer to the condition where the solenoids are polarized to traverse the scraper towards the second position 38. Conversely, the "off" state of the two solenoids will be referred to as the condition wherein the scraper is returned back to rest at the first position 36. The "on" or "off" state of the two solenoids may be properly controlled by a programmable logic computer (PLC). Accordingly, a programmable logic is implemented to allow the movable scraper to efficiently remove the buildup from the surface of the protective shield of the RTD, without inducing any errors in the temperature measurement itself, due to friction and/or external magnetic-field effects. The same programmable logic monitors, preferably continuously, the position of the movable scraper.

It is preferable that the programmable logic functions to both move the scraper and process the temperature data from the RTD simultaneously. However, if the signal generated by the temperature detector cannot be properly "shielded" from the electromagnetic field, then the programmable logic must sequentially coordinate the two distinct actions of moving the scraper and reading the detected temperature.

Figure 3:
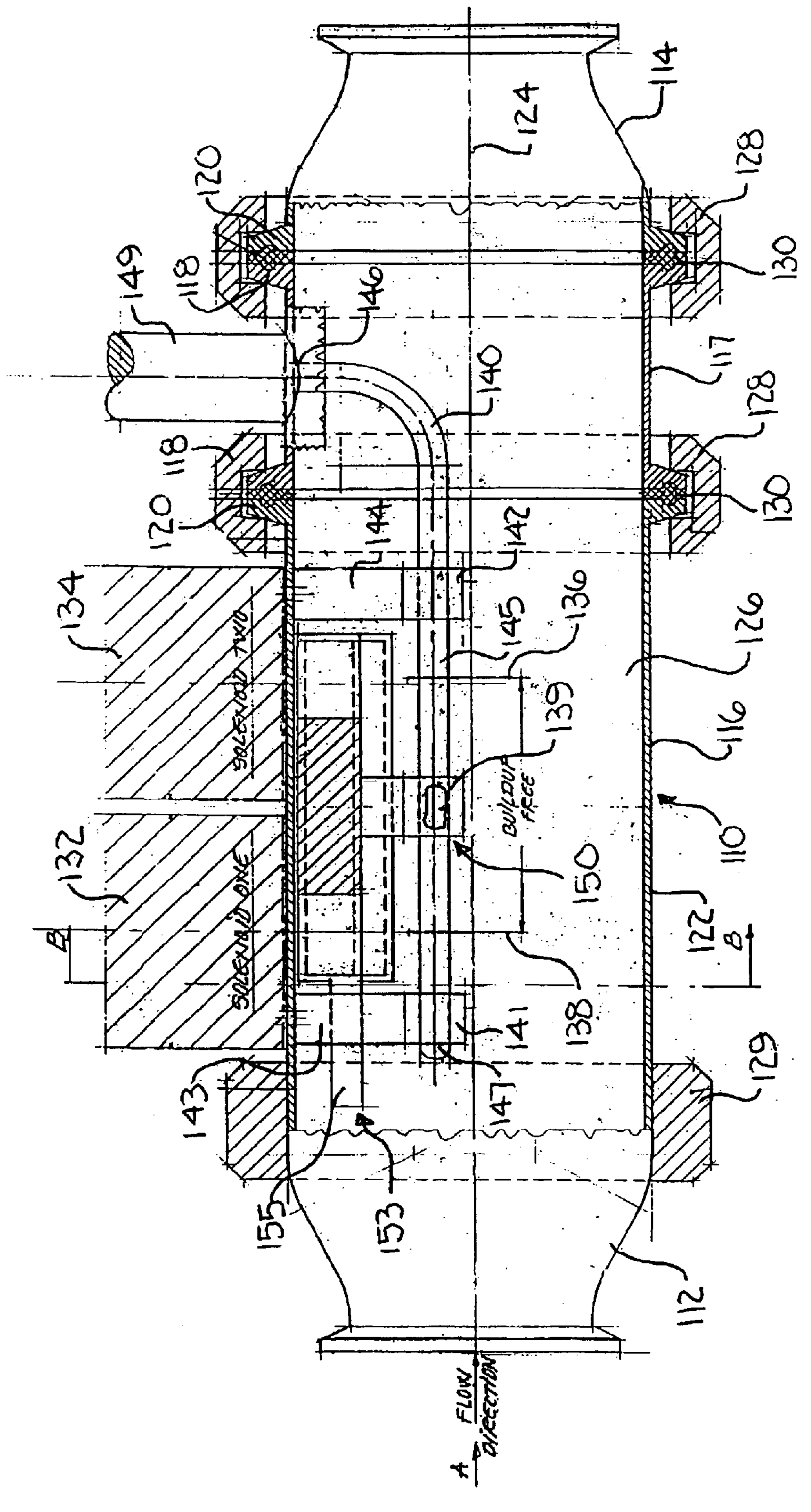
FIG. 3 is a side cross-sectional view of an alternative piping structure comprising a scraper in accordance with the present invention.

In a second embodiment, the movable scraper of the present invention is incorporated into a piping asymmetrically. As shown in FIG. 3, the fluid piping 110 is similar in construction to the piping in the first embodiment, comprising an inlet 112, an outlet 114, a generally annular straight-pipe section 116, and an annular pipe extension 117 coupled between the straight-pipe section and the outlet.

The pipe extension 117 includes annular flanges 118 at its axial ends for engaging corresponding flanges 120 carried by the straight-pipe section 116 and the outlet 114 to form a unitary sidewall 122 symmetrically disposed about the piping's central axis 124. The sidewall defines a passage 126 for passing fluid from the inlet to the outlet. Annular sanitary clamps 128 are fastened about the corresponding flanges 118 and 120 to permanently couple the pipe extension between the straight-pipe section and the outlet. Gaskets 130 are disposed between the corresponding flanges to seal the coupling. A support clamp 129 is installed about the exterior of the piping at the inlet, and the solenoids 132 and 134 are kept in a fixed position between the sanitary clamp 128 and the support clamp 129

Referring to FIG. 3, a pair of solenoids 132 and 134 are disposed about the outer surface of the straight-pipe section 116, between the sanitary and support clamps 128 and 129. The solenoids are preferably arcuate, extending over a portion preferably at least 45°, more preferably at least 90°, of the pipe's circumference. Similar to the solenoids of the first embodiment, the solenoids 132 and 134 are polarized to the generate a magnetic field for translating the scraper longitudinally between a first position 136, proximate the outlet end of the straight-pipe section, and a second position 138, proximate the inlet end of the pipe section.

An RTD or other temperature gauge 139 in a protective shield 140, similar in construction to the RTD and protective shield described in the first embodiment, is disposed within the passage 126 off-axis, or in a spaced apart but parallel relation, to the central axis 124. The RTD shield includes a proximal end 145 fixed in place by first and second support members 141 and 142. The first and second support members are fixed, preferably by welding, to the piping sidewall 122 by first and second holders 143 and 144, respectively.

The RTD shield 140 has a distal end 146 that is attached, preferably by welding, directly to the sidewall of the pipe extension 117. Specifically, a hole (not shown) corresponding in diameter to the outer diameter of the distal end 146 of the RTD shield 140 is provided in the sidewall, and the outer circumference of the distal end of the RTD shield is welded inside the hole. Outside the pipe, the wires (not shown) for the RTD that extend through the protective shield 140 pass out of the distal end 146 of the protective shield and into a second protective shield 149 outside the pipe. In the depicted embodiment, the second protective shield 149 has a diameter greater than the diameter of the RTD shield 140 and is welded to the outside of the pipe. The RTD shield is configured such that the proximal end is bent at an angle of about 90° relative to the central axis, such that the distal end is supported by the sidewall 122, in-between the sanitary clamps 128, although the RTD shield could also be straight so that it extends through the sidewall and along, for example, a diameter of the pipe. This design is advantageous in that it eliminates the need for a T-connector pipe, which is traditionally provided to mount the end of a temperature gauge shield so that it can extend outside the pipe. The use of a T-connector pipe can be undesirable for certain applications, such as the processing of pudding and other viscous food items, because such products can clog up the T-connector pipe.

The first holder 143 is an elongated bar fixed at one of its ends to the sidewall at the inlet end of the straight-pipe section 116. The first holder extends from its fixed end into the passage 126 to hold the first support member 141 about the longitudinal axis of the RTD shield. The first support is a generally cylindrical member integrally formed with the free end of the first holder, and includes an orifice (shown in dashed lines) suitably dimensioned and toleranced to receive a tip region 147 of the RTD shield.

The second holder 144 is an elongated bar fixed at one of its ends to the sidewall at the outlet end of the straight-pipe section 116. The second holder extends from its fixed end into the passage 126 to hold the second support member 142 about the longitudinal axis of the RTD shield. The second support is a generally cylindrical member integrally formed with the free end of the second holder, and includes an orifice (shown in dashed lines) suitably dimensioned and toleranced to receive a portion the proximal end 145 extending therethrough. The locations of the first and second holders 143 and 144 define the extreme positions of the stroke of the movable scraper to ensure that the magnetic core can always be attracted or repelled by either one of the solenoids 132 and 134.

Figure 4:
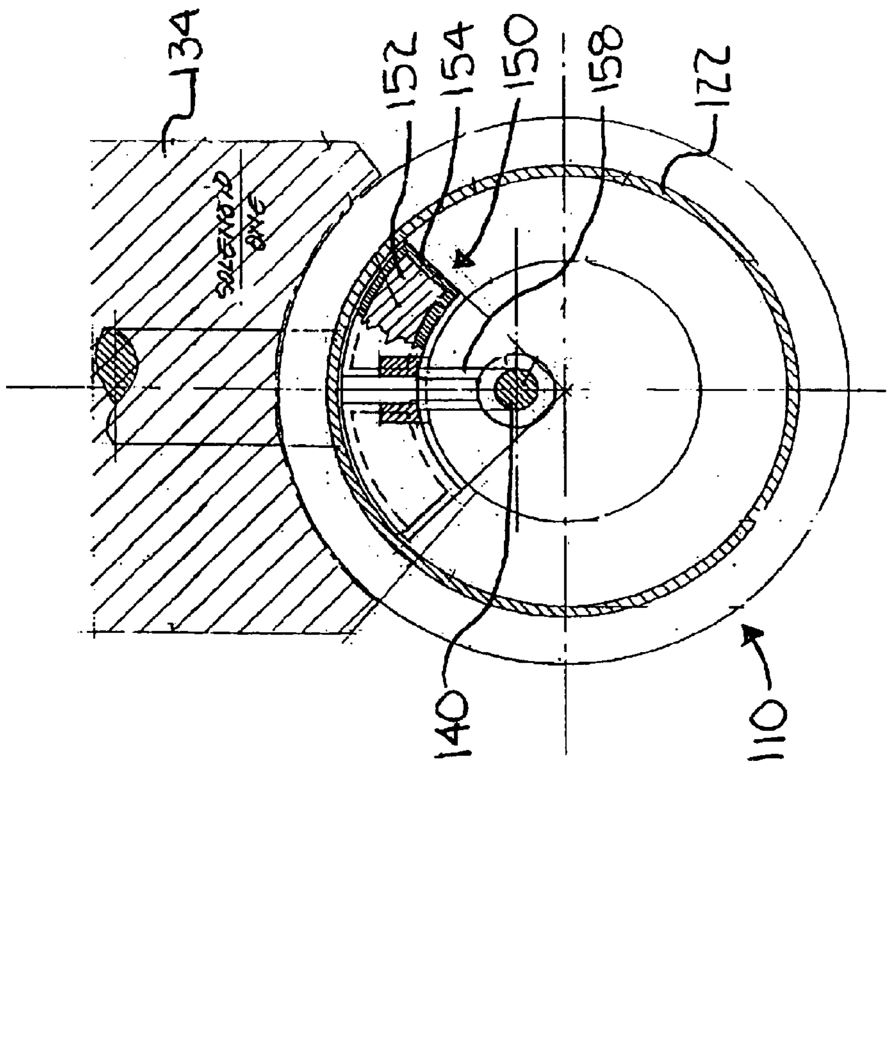
FIG. 4 is an end cross-sectional view of the piping structure of FIG. 3 along section line B—B.
Figure 5:
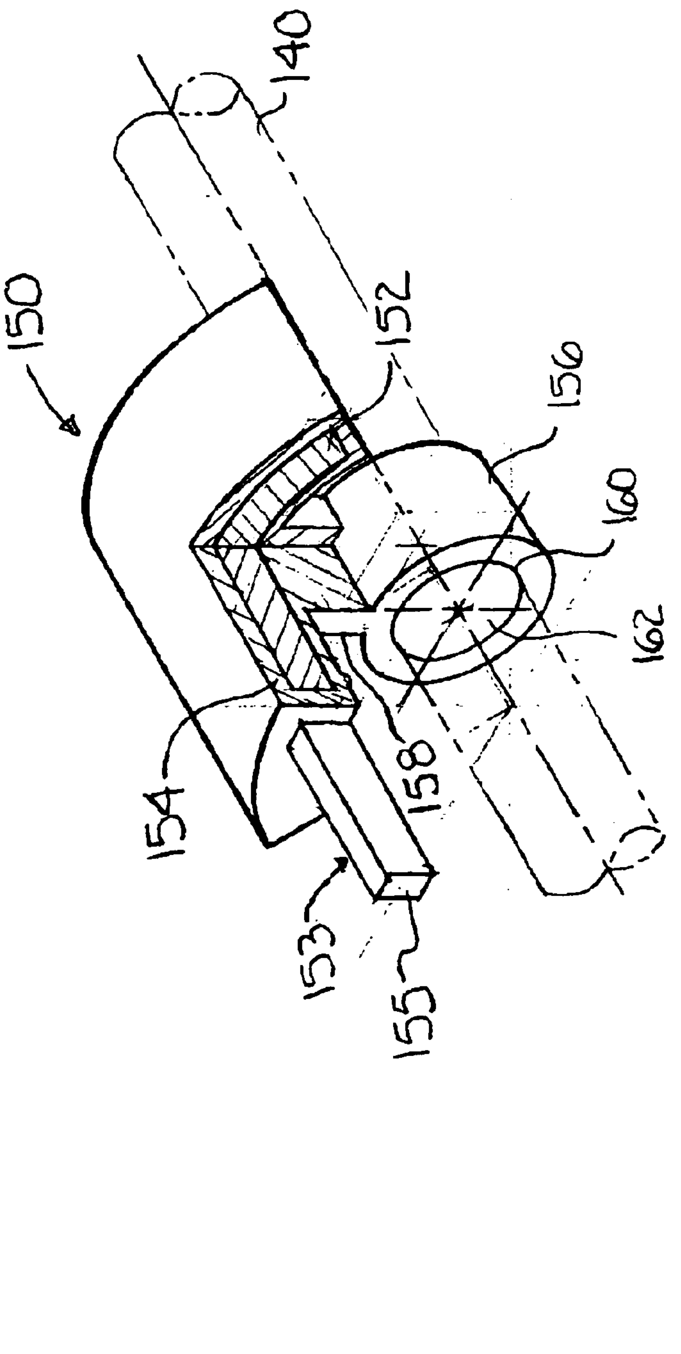
FIG. 5 is a perspective view of the wedge-like scraper used in conjunction with the piping structure of FIG. 3.

As shown in FIGS. 4 and 5, the scraper 150 is slidably mounted about the RTD shield 140 and movable longitudinally between the first and second support members 141 and 142. Referring now to FIG. 5, the scraper comprises an arcuate or partially cylindrical magnetic core 152, forming the outermost diametrical portion of the scraper, and a cylindrical scraping element 156 slidably disposed about the RTD shield 140. The magnetic core is formed from a magnetizable material, such as those described above, and encased within a stainless steel sheathing 154. The magnetic core preferably extends circumferentially over an angle of at least 45°, more preferably 90°, and the outer diameter of the stainless steel sheathing should be machined to a tolerance suitable for the arcuate magnetic core to reach as close as possible to the sidewall 122 of the pipe. This provides the strongest magnetic coupling between the scraper and the solenoids 132 and 134, while maintaining a certain gap between the magnetic core and the sidewall to prevent any direct friction with the pipe, as well as to allow free flow of any articulate material around the magnetic core.

The magnetic core is further designed with a special guide 153 comprising a pair of indexing tabs 155 that extend axially from an end of the magnetic core. The tabs are disposed about an axial end of the magnetic core in a spaced relationship to "straddle" or receive the first holder 143 between them. The tabs have a length sufficient for the tabs to be in engaging contact with the first holder during the entire "stroke" of the scraper. The guide acts to center the scraper as it is moved longitudinally along the RTD shield.

The cylindrical scraping element 156 is concentrically disposed within the arcuate magnetic core and coupled to the sheathing 154 by an elongated truss 158. The scraping element of this embodiment is similar in construction to that of the first embodiment; namely, it comprises an inner diameter 160 defining an orifice 162 suitably dimensioned and toleranced to provide a proper fit around the protective shield of the RTD 140. This allows the scraping element to traverse longitudinally along a portion of the RTD shield with minimal friction. A careful concentric design of the pipe sidewall, arcuate magnetic core and scraping element is desirable to provide the proper balancing of the magnetic core within the magnetic field generated by the two solenoids, so that friction between the movable scraper and the protective shield of the RTD is minimized.

In this embodiment, the magnetic core 152 is described as extending circumferentially over an angle of approximately 90°, while the scraping element 156 is disposed about the entire outer surface of the RTD shield. However, one skilled in the art would appreciate that the magnetic core may extend over an angle greater or less than 90° and/or that the scraping element may be disposed about only a portion, for example, at least 90° or 180°, of the RTD shield's outer surface.

In accordance with the present embodiment, the scraping element operates much like the scraping element of the first embodiment, traversing back and forth along a portion of the RTD shield to remove or "scrape off" any fouling buildup that may accumulate along the proximal end of the RTD shield. The solenoids 132 and 134 are magnetically coupled to scraping element 156 to move it longitudinally along the protective shield of the RTD 140 between the first position 136 and the second position 138. This keeps the region of the WTD shield defined by the stroke free of fouling deposit buildup. The modified off-axis design of the scraper in the second embodiment provides the additional benefits of simplifying the internal geometry of the temperature gauge and minimizing the effect of flow drag upon the moving parts installed inside the pipe.

Figure 6:
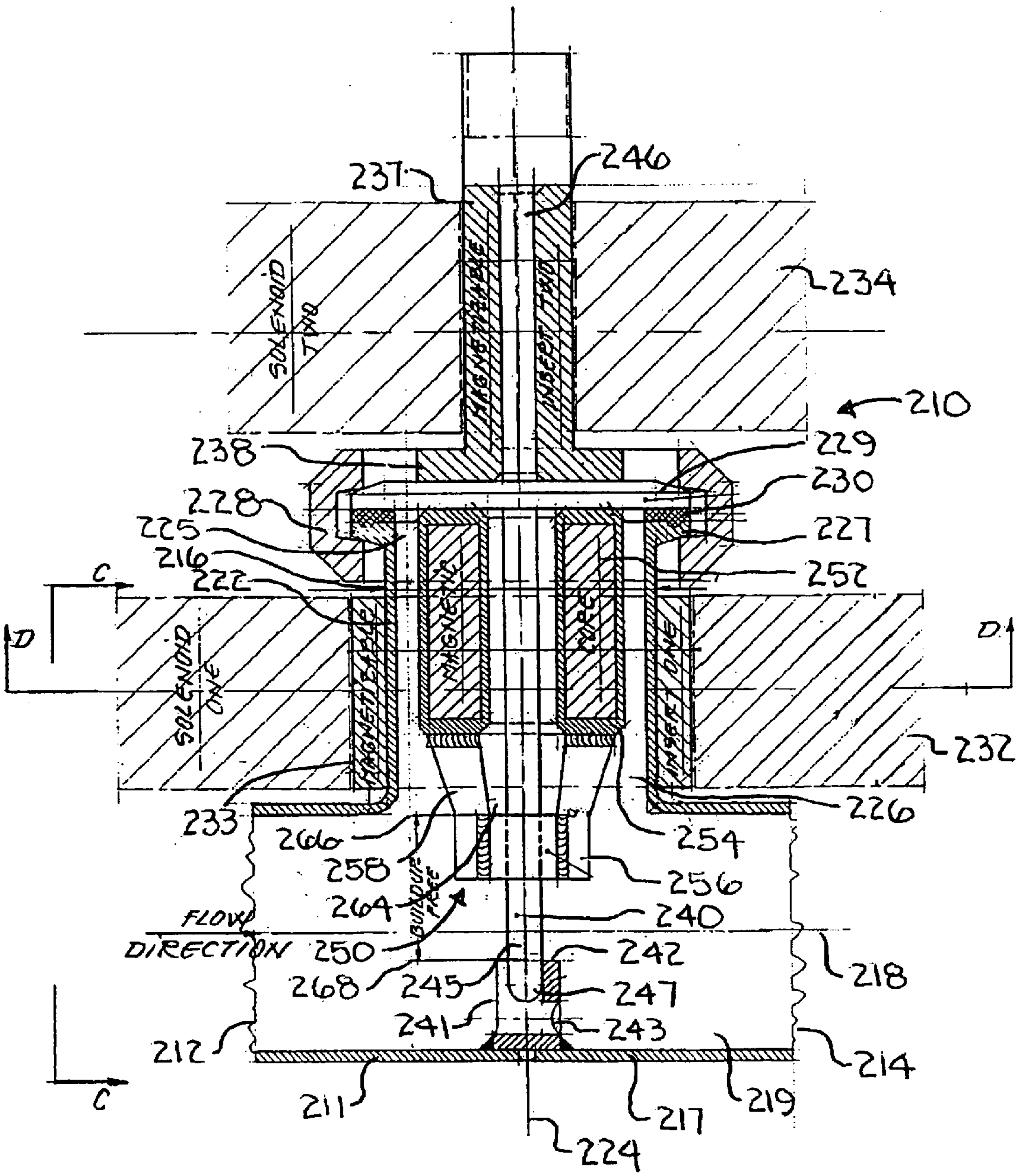
FIG. 6 is a side cross-sectional view of another alternative piping structure comprising a scraper in accordance with the present invention.

In another embodiment, the movable scraper of the present invention is incorporated into a piping structure having a tee-connection design. As shown in FIG. 6, the fluid piping 210 is a substantially T-shaped connector comprising a primary pipe section 211 having an inlet 212 and outlet 214, and a transverse pipe section 216 coupled to the primary pipe section between the inlet and the outlet. The piping may be formed from any suitable corrosion-resistant material, such as those described above. The primary pipe section comprises an annular sidewall 217 symmetrically disposed about the primary section's central axis 218 to form a passage 219 for passing fluid from the inlet to the outlet.

The transverse pipe section 216 is generally of cylindrical construction, comprising a cylindrical sidewall 222 symmetrically disposed about an axis 224 substantially perpendicular to the central axis 218 of the primary pipe section 211. The sidewall 222 defines a reservoir 226 having an open end 225 and an opposite axial end in communication with the passage 219. The transverse pipe section includes an annular flange 227 disposed about the open end of the transverse pipe. A sanitary cap 229 is removably attached to the open end about the annular flange to enclose the reservoir and prevent fluid from escaping the piping 210. An annular sanitary clamp 228 fastened about the flange 227 and the cap 229 permanently couples the cap to the piping structure. A gasket 230 disposed between the flange and the sanitary cap seals the coupling.

An RTD and protective shield 240, similar in construction to the RTDs and protective shields described in the earlier embodiments, is longitudinally disposed within the transverse pipe section 216 along transverse axis 224. The RTD shield includes a proximal end 245 extending into the passage 219 of the primary pipe section 211, generally transverse to the direction of the fluid flow, and a distal end 246 coupled to a PLC (not shown). A tip region 247 of the proximal end is supported by a holder 241 coupled to a central portion of the primary pipe section sidewall 217. In the depicted embodiment, the holder is a cylindrical member comprising an orifice 235 for receiving the tip region of the RTD shield. The orifice is preferably dimensioned to the outer diameter of the RTD shield to provide a "snug fit" between the outer diameter of the RTD shield and the inner diameter of the orifice. The holder further includes a port 236 extending through a lower portion of the holder, parallel to the central axis 218 of the primary pipe section 211. The port is tapped through the holder to allow free flow of fluid passing about the holder.

The distal end 246 of the RTD shield is coupled to a central portion of the sanitary cap 228. The sanitary cap is sealed, preferably by an O-ring (not shown), at the coupling and acts as a second mechanical support for the RTD shield. The locations of the holder 241 and the sanitary cap 229 define the extreme positions of the stroke of the movable scraper.

Similar to the embodiments described above, a pair of solenoids are incorporated into the piping structure to move the scraper longitudinally along axis 224, i.e., longitudinally along the RTD shield 240. As shown in FIG. 6, a first solenoid 232 is disposed about the outer surface of the transverse pipe section 216. The first solenoid is similar in construction to the solenoid of the first embodiment described above. A first magnetic insert 233 is disposed between the outer surface of the sidewall 222 of the transverse section 216 and the inner surface of the first solenoid to mechanically couple the solenoids to the transverse pipe section. The first insert is generally annular in construction and may be made from a magnetizable material, such as iron. The inner diameter of the first insert preferably corresponds in dimension to the outer diameter of the transverse pipe. The outer diameter of the first insert preferably corresponds in dimension to the inner diameter of the first solenoid.

A second solenoid 234 is disposed about the distal end 246 of the RTD shield 240 so that the second solenoid is distal to the scraper rather positioned circumferentially about the scraper. The second solenoid is generally similar in construction to the first solenoid 232. A second magnetic insert 237 is disposed between the protective shield of the RTD and the inner surface of the second solenoid. The second insert is generally annular in construction and may be made from a magnetizable material similar to that of the first insert 233. The inner diameter of the second insert preferably corresponds in dimension to the outer diameter of the RTD shield. The outer diameter of the second insert preferably corresponds in dimension to the inner diameter of the second solenoid.

The second solenoid further includes an annular flange 238 at one of its axial ends. The flange is mechanically coupled to a top portion of the sanitary cap 229. The second insert magnetically couples the second solenoid to the scraper.

Figure 7:
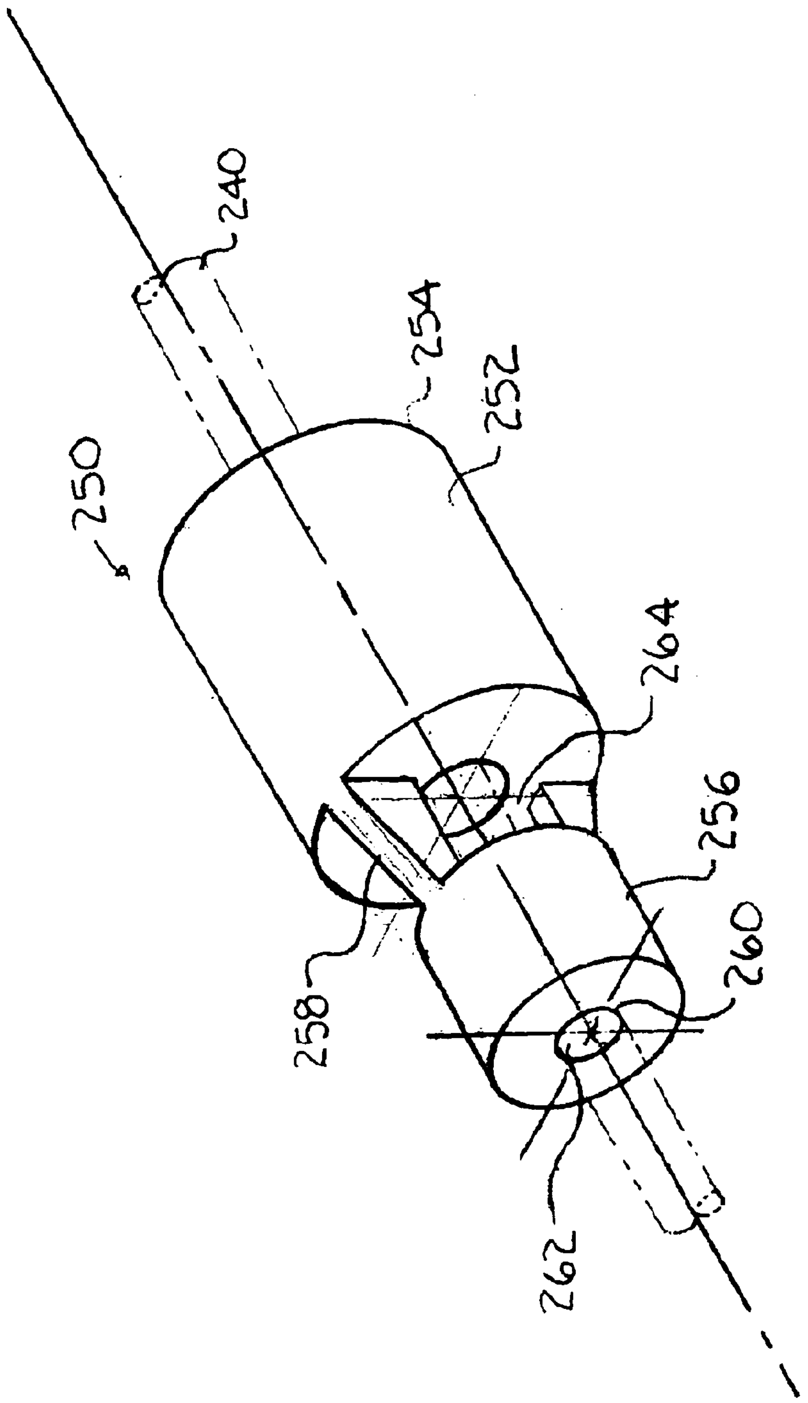
FIG. 7 is a perspective view of the scraper used in conjunction with the piping structure of FIG. 6.

As shown in FIG. 6, the scraper 250 is slidably mounted about the RTD shield 240 and movable longitudinally between the holder 241 and the sanitary cap 228. Referring now to FIG. 7, the scraper is a generally elongated annular structure having a magnetic core 252 at one axial end, a scraping element 256 at the opposite axial end, and a pair of truss 258 coupled between the magnetic core and the scraping element. The magnetic core is generally cylindrical and forms the outermost diametrical portion of the scraper. The magnetic core comprises a magnetizable material encased within a stainless steel sheathing 254. Similar to the magnetic core of the first embodiment, the outer diameter of the stainless steel sheathing is preferably machined to a tolerance suitable for the cylindrical magnetic core to reach as close as possible to the sidewall 222 of the transverse pipe section 216, allowing for the strongest magnetic coupling with the first solenoid 232, while maintaining a certain gap between the magnetic core and the sidewall to prevent any direct friction with the pipe. The inner diameter of the sheathing may be of any dimension suitable for receiving the proximal end of the RTD shield extending therethrough.

The cylindrical scraping element 256 is positioned coaxially with but offset longitudinally from the magnetic core and forms the inner most diametrical portion of the scraper. The scraping element comprises an inner diameter 260 defining an orifice 262 suitably dimensioned and toleranced to provide a proper fit around the protective shield of the RTD 240 to allow the scraping element to traverse longitudinally along a portion of the RTD shield with minimal friction.

The truss 258 connect the outer diameter of the magnetic core and the reduced outer diameter of the scraping element. The truss define an open region 264 for passing fluid around the scraper when the scraper is positioned in the passage 219.

In accordance with the present embodiment, the scraper 250 operates much like the scraper of the earlier embodiments, traversing back and forth along a portion of the RTD shield to remove or "scrape off" any fouling buildup that may accumulate along the proximal end of the RTD shield. However, in this embodiment the RTD shield is installed transverse rather than parallel to the direction of the fluid flow to minimize the flow drag caused by the magnetic core, which is primarily contained within the transverse section 216. Thus, the scraper is moved into and out of the flow to "clean" a portion of the proximal end 245.

The solenoids 232 and 234 are magnetically coupled to the scraping element 256 to move it longitudinally along the RTD shield 240 between a first position 266 and a second position 268 to keep a region of the RTD shield defined by the stroke free of fouling deposit buildup. In accordance with various embodiments of the present invention described above, the "scraped off" fouling deposit is swept away with the fluid flowing through the piping. The present invention provides a device and improved method of obtaining a more accurate instantaneous reading of the local temperature by the RTD.

The preceding description has been presented with reference to certain embodiments of the invention. While embodiments of the present invention are described for use with a temperature gauge, workers skilled in the art and technology to which this invention pertains will appreciate that the present invention may be used for various measurement devices, for example, pressure probes or pitot tubes for measuring local pressure, and alterations and changes in the described device may be practiced without meaningfully departing from the principal, spirit and scope of the invention. Accordingly, the foregoing and accompanying drawings should not be read as pertaining only to the precise embodiments described, but rather should be read consistent and as support to the following claims which are to have their fullest and fair scope.

What is claimed is:

1. An apparatus for obtaining local fluid properties along a fluid piping system comprising:

a primary pipe comprising an inlet, an outlet, and at least one sidewall that defines a conduit for passing fluid from the inlet to the outlet;

a protective shield disposed with the conduit;

a scraper disposed about at least a portion of the protective shield for removing buildup on the protective shield, the scraper being longitudinally movable along the protective shield between a first position and a second position by an external force; and a measurement device mounted within the protective shield between the first position and the second position.

2. An apparatus according to claim 1, wherein at least a portion of the scraper comprises a magnetic material.

3. An apparatus according to claim 2, wherein the apparatus further comprises at least one solenoid or permanent magnet installed outside the primary pipe, wherein the at least one solenoid or permanent magnet generates an external electromagnetic force for longitudinally moving the scraper.

4. An apparatus according to claim 3, wherein the apparatus comprises two solenoids installed outside the primary pipe.

5. An apparatus according to claim 4, wherein the primary pipe has a circumference and each solenoid is mounted around the entire circumference of the primary pipe.

6. An apparatus according to claim 4, wherein the primary pipe has a circumference and each solenoid is mounted around a portion of the circumference of the primary pipe.

7. An apparatus according to claim 2, wherein the primary pipe is generally tubular and the apparatus further comprises:

a first solenoid mounted circumferentially around at least a portion of the primary pipe and polarized with an S-N polarity; and a second solenoid mounted circumferentially around at least a portion of the primary pipe next to the first solenoid and polarized with an N-S polarity;

whereby the solenoids create an electromagnetic field that, when applied to the scraper, move the scraper longitudinally along the protective shield between the first position and the second position.

8. An apparatus according to claim 7, wherein the scraper comprises:

a scraping element slidably disposed about at least a portion of the outer perimeter of the protective shield between the first and second positions; and a magnetic core attached to the scraping element and positioned between the scraping element and the solenoids.

9. An apparatus according to claim 8, wherein the magnetic core is generally tubular.

10. An apparatus according to claim 8, wherein the scraping element is generally tubular and is disposed about the entire outer perimeter of the protective shield.

11. An apparatus according to claim 10, wherein the magnetic core is generally cylindrical and is concentrically disposed about the scraping element.

12. An apparatus according to claim 1, wherein the scraper comprises:

a scraping element slidably disposed about at least a portion of the outer perimeter of the protective shield between the first and second positions; and a magnetic core attached to the scraping element and positioned between the scraping element and the sidewall of the primary pipe.

13. An apparatus according to claim 12, wherein the magnetic core is generally tubular.

14. An apparatus according to claim 12, wherein the scraping element is generally tubular and is disposed about the entire outer perimeter of the protective shield.

15. An apparatus according to claim 14, wherein the magnetic core is generally cylindrical and is concentrically disposed about the scraping element.

16. An apparatus according to claim 1, wherein the primary pipe is generally tubular and the protective shield is mounted coaxially within the primary pipe.

17. An apparatus according to claim 1, wherein the primary pipe is generally tubular and the protective shield is mounted parallel to the axis of the primary pipe.

18. An apparatus according to claim 1, wherein the measurement device comprises a temperature sensor.

19. An apparatus according to claim 1, further comprising a second pipe that is perpendicular to the primary pipe, the second pipe having a closed end, an open end in communication with the conduit of the primary pipe, and at least one sidewall defining a secondary conduit between the closed and open ends; wherein the protective shield is disposed parallel to the axis of the secondary conduit so that an end of the protective shield is positioned within the primary conduit.

20. An apparatus according to claim 19, wherein at least a portion of the scraper is disposed within the secondary conduit.

21. An apparatus according to claim 19, wherein at least a portion of the scraper comprises a magnetic material.

22. An apparatus according to claim 19, wherein the apparatus further comprises at least one solenoid or permanent magnet installed outside the primary pipe, wherein the at least one solenoid or permanent magnet generates an external electromagnetic force for longitudinally moving the scraper.

23. An apparatus according to claim 22, wherein the apparatus comprises two solenoids installed outside the primary and secondary pipes.

24. An apparatus according to claim 23, wherein the scraper comprises:

a scraping element slidably disposed about at least a portion of the outer perimeter of the protective shield between the first and second positions; and a magnetic core attached to the scraping element and positioned between the scraping element and the solenoids.

25. An apparatus according to claim 24, wherein the scraping element is generally tubular and is disposed about the entire outer perimeter of the protective shield.

26. A method for cleaning a portion of a protective shield containing a measuring device, the method comprising:

providing a scraper disposed about at least a portion of the protective shield, wherein the protective shield is disposed within a pipe;

applying an external force to the scraper to move the scraper longitudinally along the protective shield between first and second positions to thereby clean the portion of the protective shield over which the scraper moves, wherein the external force is generated by two solenoids installed outside the pipe.

27. A method according to claim 26, wherein the pipe has a circumference and each solenoid is mounted around the entire circumference of the pipe.

28. A method for cleaning a portion of a protective shield containing a measuring device, the method comprising:

providing a scraper disposed about at least a portion of the protective shield, wherein the protective shield is disposed within a pipe, and wherein the pipe is generally tubular and the apparatus further comprises:

a first solenoid mounted circumferentially around at least a portion of the pipe and polarized with an S-N polarity; and a second solenoid mounted circumferentially around at least a portion of the pipe next to the first solenoid and polarized with an N-S polarity;

whereby the solenoids create an electromagnetic field that move the scraper longitudinally along the protective shield between the first position and the second position; and applying an external force to the scraper to move the scraper longitudinally along the protective shield between first and second positions to thereby clean the portion of the protective shield over which the scraper moves.

29. A method according to claim 28, wherein the scraper comprises:

a scraping element slidably disposed about at least a portion of the outer perimeter of the protective shield between the first and second positions; and a magnetic core attached to the scraping element and positioned between the scraping element and the solenoids.

30. A method according to claim 29, wherein the scraping element is generally tubular and is disposed about the entire outer perimeter of the protective shield.

31. A method according to claim 30, wherein the magnetic core is generally cylindrical and is concentrically disposed about the scraping element.

* * * * *